US011499598B2

(12) United States Patent
Galimberti et al.

(10) Patent No.: US 11,499,598 B2
(45) Date of Patent: Nov. 15, 2022

(54) METHOD AND PLANT FOR MANUFACTURING BRAKING ELEMENTS

(71) Applicant: ITT ITALIA S.R.L., Lainate (IT)

(72) Inventors: Paolo Galimberti, Barge (IT); Marco Belli, Barge (IT); Sergio Ferrero, Barge (IT)

(73) Assignee: ITT Italia S.R.L., Lainate (IT)

( * ) Notice: Subject to any disclaimer, the term of this patent is extended or adjusted under 35 U.S.C. 154(b) by 0 days.

(21) Appl. No.: 17/155,710

(22) Filed: Jan. 22, 2021

(65) Prior Publication Data

US 2021/0246957 A1    Aug. 12, 2021

Related U.S. Application Data

(63) Continuation of application No. 16/330,053, filed as application No. PCT/IB2017/055275 on Sep. 1, 2017, now abandoned.

(30) Foreign Application Priority Data

Sep. 2, 2016    (IT) .......................... 102016000089414

(51) Int. Cl.
*B32B 41/00*    (2006.01)
*F16D 69/04*    (2006.01)

(52) U.S. Cl.
CPC ......... *F16D 69/0408* (2013.01); *F16D 69/04* (2013.01); *F16D 2069/0425* (2013.01);
(Continued)

(58) Field of Classification Search
CPC ................. F16D 69/0408; F16D 69/04; F16D 2069/0425; F16D 2200/0004; F16D 2069/0491; F16D 2069/0466
(Continued)

(56) References Cited

U.S. PATENT DOCUMENTS 3,964,580 A    6/1976    Hahm et al.
6,601,684 B2   8/2003    Collis et al.
(Continued)

FOREIGN PATENT DOCUMENTS

CN    1066105    11/1992
CN    1745257    3/2006
(Continued)

OTHER PUBLICATIONS

Chinese Search Report for Chinese Application No. 2017800602224, dated Jan. 4, 2020, 2 pages.
(Continued)

*Primary Examiner* — Michael N Orlando
*Assistant Examiner* — Joshel Rivera
(74) *Attorney, Agent, or Firm* — Knobbe, Martens, Olson & Bear, LLP

(57) ABSTRACT

Method and plant for manufacturing braking elements such as vehicle brake pads. The plant can comprise a first station that applies an adhesive to a first face of a metallic element; a second station that applies to the first face of the metallic element a block of friction material; a checking station that verifies the presence of the adhesive by detecting the gray level of a plurality of points of at least one zone of the first face; and a processing unit that compares the gray level detected for each point with a first threshold value, counts the number of points that have a gray level that satisfies a relationship (which is a function of the threshold value,) and compares such a value with a second threshold value to discard those metallic elements for which the percentage calculated does not correspond to the second threshold value.

15 Claims, 1 Drawing Sheet

(52) U.S. Cl.
CPC ........... *F16D 2069/0466* (2013.01); *F16D 2069/0491* (2013.01); *F16D 2200/0004* (2013.01)

(58) Field of Classification Search
USPC .............. 156/64, 350, 351, 378, 379
See application file for complete search history.

(56) References Cited

U.S. PATENT DOCUMENTS

| | | |
|---|---|---|
| 9,360,067 B1 | 6/2016 | Arbesman et al. |
| 2014/0165350 A1 | 6/2014 | O'Neil |
| 2014/0332334 A1 | 11/2014 | Ocedek et al. |
| 2014/0337672 A1 | 11/2014 | Hanzaike et al. |

FOREIGN PATENT DOCUMENTS

| | | |
|---|---|---|
| CN | 101413558 | 4/2009 |
| CN | 101433473 | 5/2009 |
| CN | 102060191 A | 5/2011 |
| CN | 102080700 | 6/2011 |
| CN | 103144135 | 6/2013 |
| CN | 103352945 | 10/2013 |
| CN | 203766099 | 8/2014 |
| CN | 104813060 | 7/2015 |
| CN | 104948612 | 9/2015 |
| CN | 105164446 | 12/2015 |
| CN | 105333042 | 2/2016 |
| CN | 205308713 | 6/2016 |
| CN | 205308713 U | 6/2016 |
| EP | 2443359 | 4/2012 |
| GB | 2289941 | 12/1995 |
| GB | 2383619 A | 7/2003 |
| JP | S63-102919 A | 5/1988 |
| JP | S63140133 | 6/1988 |
| WO | WO 00/09902 A1 | 2/2000 |
| WO | WO2015/181697 | 12/2015 |
| WO | WO 2018/042382 A2 | 3/2018 |

OTHER PUBLICATIONS

Chinese Supplemental Search Report for Chinese Application No. 2017800602224, dated Jan. 4, 2020, 1 page.
International Search Report and Written Opinion in corresponding International Patent Application No. PCT/IB2017/055275, dated Mar. 1, 2018, in 13 pages.
Chinese Supplemental Search Report for Chinese Application No. 2017800602224, dated Nov. 11, 2022, in 2 pages.
Written Opinion for Korean Application No. KR10-2019-7008685, dated Mar. 23, 2022, in 4 pages.
Italian Search Report and Written Opinion for Italian Application No. 102016000089414, dated May 17, 2017, in 8 pages.

METHOD AND PLANT FOR MANUFACTURING BRAKING ELEMENTS

INCORPORATION BY REFERENCE TO ANY PRIORITY APPLICATIONS

Any and all applications, if any, for which a foreign or domestic priority claim is identified in the Application Data Sheet of the present application are hereby incorporated by reference in their entireties under 37 CFR 1.57.

TECHNICAL FIELD

The present disclosure relates to a method and a plant for manufacturing braking elements, in particular highly reliable brake pads.

BACKGROUND ART

It is known that the brake pads of vehicles and, more generally, any other type of braking element, such as brake shoes, are formed from a metallic support upon one side of which—facing in use towards an element to be braked, for example a brake disc—a block of friction material is integrally mounted.

The block of friction material can be formed in situ, i.e., molded directly onto the metallic support, or else it is formed separately and then applied to the metallic support. In both cases, in order to ensure the reliable attachment of the block of friction material to the metallic support, the face or zone of the face of the latter, intended to receive the block of friction material, receives beforehand a layer of adhesive.

The adhesive can be applied to the face of the metallic support intended to receive the block of friction material in many ways, for example by spraying or by means of a roller.

If the adhesive layer is not correctly applied to the metallic surface, the block of friction material may be subject in use to accidental detachments and, therefore, the braking element will not be reliable.

It is also known from CA2429870 to introduce during the production phase of a clutch disc, where a similar problem is posed in order to ensure the bonding of an annular block of friction material onto a disk shaped metallic support, a verification step by means of a video camera of the presence of a layer of adhesive applied in the liquid phase onto the metallic support within a channel intended to subsequently receive the friction material. The video camera signal is compared to a preset value stored in the system and if the adhesive layer is absent or insufficient, an alert is generated.

However, the system described in CA2429870 is not applicable as such in the verification of metallic supports of brake pads, or braking elements in general, especially if a liquid phase adhesive is used.

In fact, in order to ensure an adhesion between the metallic support and the block of friction material that is suitable for avoiding any accidental detachments in use, it is not sufficient that the adhesive layer be present; it is also necessary that it be present in a suitable concentration (amount per unit area), calculated during the design stage; on the contrary, it is possible that during the application of the liquid adhesive, typically by spraying, the concentration of adhesive in the applied layer is variable.

SUMMARY

The object of the present disclosure is to provide a method and a plant for manufacturing braking elements, particularly brake pads that are highly reliable in use, and that therefore makes it possible to verify in an absolutely reliable way, not only the presence of an adhesive—especially of a water-based adhesive in liquid phase—upon the metallic support prior to the step of applying the block of friction material onto the metallic support, but that also makes it possible to verify the amount of adhesive deposited, in order to ensure the necessary reliability of the braking element in use.

The disclosure is thus related to a method and a plant for manufacturing braking elements, in particular brake pads that are highly reliable in use, having the characteristics set out in the attached claims.

BRIEF DESCRIPTION OF THE DRAWINGS

Further characteristics and advantages of the present disclosure will become clear from the following description of an exemplary non-limiting embodiment thereof given purely by way of example and with reference to the figures within the accompanying drawings, wherein.

DETAILED DESCRIPTION

Figure 1:
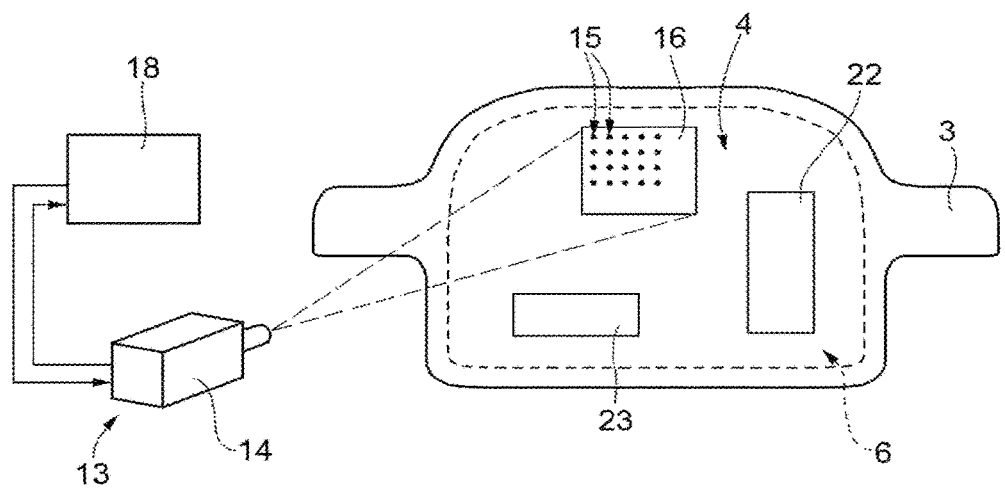
FIG. 1 schematically illustrates a step of the method according to the disclosure as applied to a metallic support for a vehicle brake pad.
Figure 2:
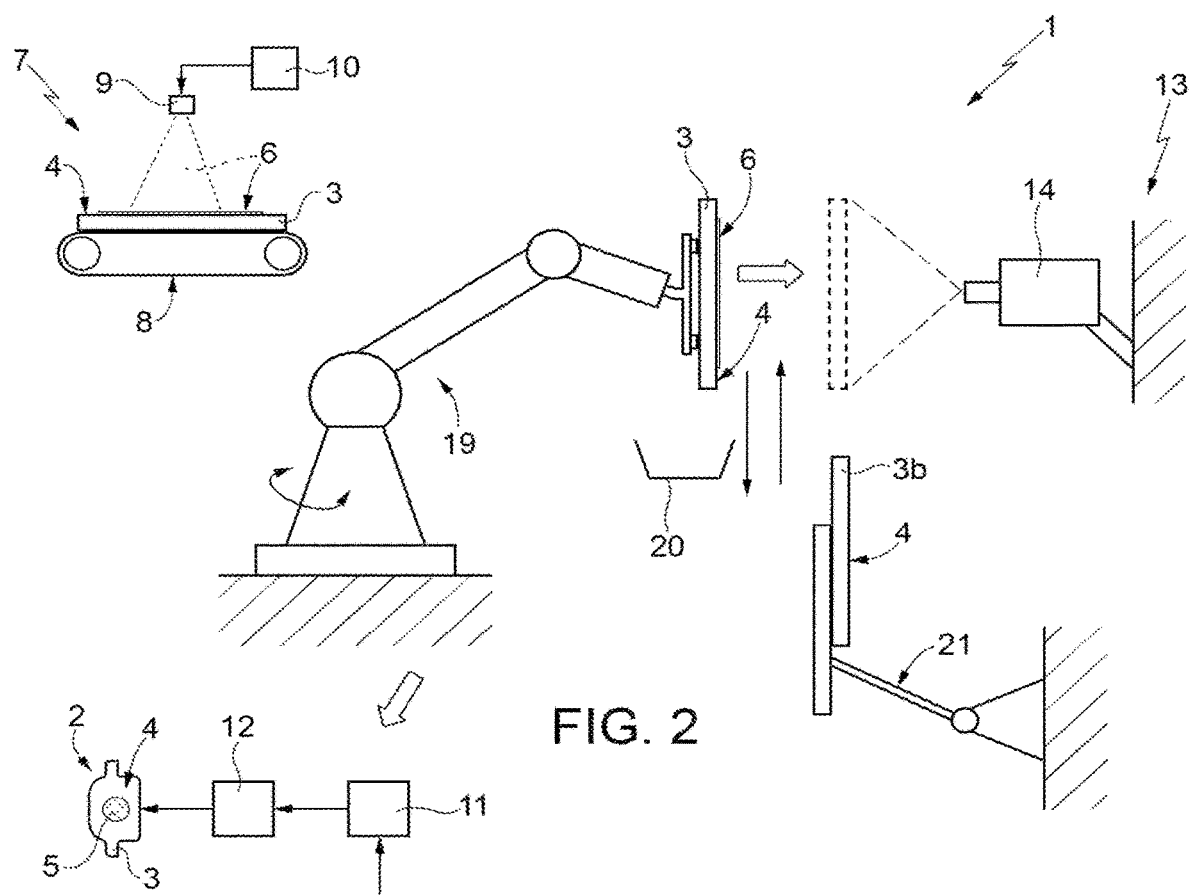
FIG. 2 schematically and partly by means of a block diagram illustrates further steps of the method of the disclosure and the main elements of the plant according to the disclosure.

With reference to FIGS. 1 and 2, indicated as a whole with 1 is a plant (FIG. 2) for manufacturing a braking element 2, known and illustrated only schematically in FIG. 2, in particular a brake pad, comprising a metallic support that is defined by a metallic element 3 exhibiting a first face 4, in the example illustrated substantially flat, upon which there is integrally carried by the support or metallic element 3, in a known way, a block of friction material 5. The block of friction material 5 is formed in a known manner, by heating under pressure; it can be formed separately and then attached to the face 4, or else it can be co-molded onto the metallic support 3. In both cases, the block of friction material 5 is rendered integral with the metallic support 3 by means of a layer of adhesive 6 carried by the face 4, in addition to any other means of attachment such as undercuts, projecting parts, etc., known and not shown for simplicity.

The plant 1 therefore comprises a first station 7 in order to apply the adhesive 6 onto the first face 4 of a metallic element 3, which has been previously processed in a known way, for example by precision blanking starting from a sheet of metal, such as to be manufactured so as to constitute the metallic support 3 of the braking element 2 to be obtained.

The station 7, in the illustrated non-limiting example, comprises an endless belt conveyor 8, known, upon which are arranged horizontally metallic supports 3 that, in the example illustrated, are in the form of flat plates, with the face 4 facing upwards, that is, facing the part opposite to the conveyor 8. The station 7 also comprises a nozzle 9 suitable for spraying onto the face 4 an adhesive 6 in the liquid phase, which is taken from a reservoir 10.

The plant 1 also comprises at least a second station 11, known and indicated schematically with a block in FIG. 2, for applying onto the first face 4 of the braking element 3 a block 5 of friction material in such a way as to obtain the braking element 2; and, in the example illustrated, a third station 12 for curing/thermally treating the block 5 of friction material.

According to the disclosure, the plant 1 also comprises a checking station 13 for verifying the presence of the adhesive 6 on the first face 4 of the metallic element 3 after the metallic element 3 has left the first station 7 and before the metallic element 3 reaches the at least a second station 11.

The checking station 13, illustrated only in schematic form, partly in FIG. 1 and partly in FIG. 2, comprises: a video camera 14, preferably of the digital type, designed to detect the gray level of a plurality of points 15 (illustrated only schematically and not to scale in FIG. 1) of at least a first portion or zone 16 of a predetermined width of the first face 4 of the metallic element 3, also shown only in a schematic way; an electronic processing unit 18, which may consist of a simple computer with appropriate software and interfaced with the video camera 14; and at least one robot 19, for example of an anthropomorphic type and equipped with at least four CNC axes, designed to pick up one metallic element 3 at a time from the first station 7, namely from the conveyor 8, after the face 4 has received the adhesive 6, in order to present the metallic element 3, on the side of the face 4 that has received the adhesive 6, in front of the video camera 14 as it is schematically illustrated in FIGS. 1 and 2.

The robot 19, controlled by the processing unit 18, which, as shall be seen, is designed to recognize as faulty those metallic elements 3 that, in the station 7, have not received sufficient adhesive 6 on the face 4, is suitable for selectively discarding the defective metallic elements 3, for example by allowing them to drop into a container 20 arranged beneath the robot 19, between the robot and the video camera 14, and to move the non-defective metallic elements 3, i.e., those that in the station 7 have received an adequate amount of adhesive 6 on the face 4, towards the at least a second station 11.

In particular, the video camera 14 is designed to detect 256 gray levels for each and every point 15 of the portion or zone 16 that is framed by the video camera 14.

According to a non-secondary aspect of the disclosure, the checking station 13 also comprises a mobile support 21 that holds a sample metallic element 3b which is identical to those metallic elements 3 upon which the presence of the adhesive 6 is to be verified, but having a first face 4 that is free of adhesive 6 and/or bearing an underspecified, i.e., insufficient, amount of adhesive spread onto the face 4, or else on selected portions of the same.

The mobile support 21 is designed to arrange from time to time, in front of the video camera 14 the adhesive-free, or in any case non-compliant, sample metallic element 3b whilst the robot 19 picks up from the first station 7 a metallic element 3 in order to verify the presence of the adhesive 6 thereupon; and to subsequently remove from in front of the video camera 14 the non-compliant sample metallic element 3b, which is free of adhesive 6 and/or bearing an insufficient amount of adhesive 6, whilst the robot 19 places in front of the video camera 14 a metallic element 3 that has received the adhesive 6 in the station 7 in order to verify the presence of a sufficient amount of adhesive 6.

The plant 1, thus far described in relation to the main components thereof, is designed to implement a method for manufacturing a braking element 2, in particular a brake pad that is highly reliable in use.

According to the disclosure, the method implemented by the plant 1 comprises:
applying an adhesive 6 to a first face 4 of a metallic element 3 manufactured in such a way as to constitute a metallic support 3 of the braking element 2 to be obtained;
verifying the presence of the adhesive 6 on the first face 4 of the metallic element 3; and
applying to the first face 4 of the metallic element 3 a block of friction material 5 in order to obtain the desired braking element 2.

According to the disclosure, the step of verifying the presence of the adhesive 6 comprises the following steps:
i)—detecting by means of the video camera 14 the gray level of a plurality of points 15 of the at least a first zone 16 of a predetermined width of the first face 4 of the metallic element 3;
ii)—comparing by means of the processing unit 18 the gray level detected for each point 15 with a first previously stored threshold value S1, for example stored in a register of the central processing unit 18, and counting the number of points 15 that have a gray level that satisfies a predetermined mathematical relationship which is a function of the threshold value S1;
iii)—calculating, based upon the total number of points 15 of which the gray level has been detected, the percentage of points 15 that satisfy the cited predetermined mathematical relationship;
iv)—comparing the percentage calculated with a second threshold value S2; and
v)—discarding, by means of the robot 19, the metallic elements 3 for which the percentage calculated does not correspond to the second threshold value S2.

According to an aspect of the disclosure, in step i) the video camera 14 detects 256 gray levels for every point 15 of the at least a first zone 16 using a digital black and white image wherein each pixel corresponds to one of the points 15 of the at least a first zone 16 and wherein each pixel is reproduced according to a range of grays having 256 different tones.

In this step i) the value 0 is attributed by the processing unit 18 to a gray level corresponding to the color black and the value 256 to a gray level corresponding to the color white.

Therefore, the predetermined mathematical relationship which is the function of the threshold value S1 used in step ii) is an inequality in which the gray level detected for each point 15 must be less than or equal to a first predetermined range of gray values. For example, assigning the value 0 to the color black and the value 256 to the color black, the threshold value S1 will correspond to any of the finite elements of a set of values between a minimum and a maximum, for example consisting of a succession of values ranging from 0 to 70 climbing discreetly by one unit at a time:

$$\text{gray level of a point } 15 \leq S1 = \{0, 1, 2, \ldots 070\} \qquad (1)$$

The second threshold value S2 is, according to another aspect of the disclosure, a second predetermined range of percentage values within which the percentage calculated in step iii) of those points 15 that satisfy the predetermined mathematical relationship described above must be comprised. For example a range of percentage values between 70% and 90%:

$$S2 = \{70\%, 71\%, 72\%, \ldots 90\%\} \qquad (2)$$

Ultimately, the processing unit 18 will discard by means of the robot 19 those metallic elements 3 for which, for example, less than 70% or more than 90% of the points 15 have provided a gray level value between 0 and 70.

In order to allow for optimal functioning of the method described, the adhesive 6 used in the step of applying an adhesive to the face 4 of a metallic element 3 which is manufactured in such a way as to constitute a metallic support 3 of the braking element 2, is an adhesive in a liquid phase, to which a pigment or a dye has been added in a predetermined concentration.

Furthermore, the step of verifying the presence of the adhesive 6, on the first face 4 of the metallic element 3 comprises a further step consisting of setting, from time to time, the first threshold value S1 before performing step i) by placing in front of the video camera 14 a metallic element 3b that is identical to those upon which the presence of the adhesive 6 is to be verified, but having its first face 4 free of adhesive and/or bearing on all of the face 4 or on a discrete portion thereof an insufficient amount of adhesive 6 and detecting, within at least one first zone of the face 4, of predetermined size and identical to zone 16, the gray level of a plurality of points of such a first zone. For example, having the metal element 3b free or nearly free of adhesive, the gray level of the points of the face 4 should correspond to high levels, for example between 200 and 250; the video camera 14 is then calibrated by the processing unit 18 in order to provide correct gray level values that will make it possible to fall within the expected range. This makes it possible to account for variations due to lighting conditions, which may vary in the presence of dust or dirt, etc.

Preferably, the steps from i) to iii) are performed on a plurality of portions, indicated with 16, 22 and 23 in FIG. 1, of a predetermined width, of the first face 4 of the metallic element, positioned discretely, i.e. spaced apart from each other, and of a different shape and size. In this case, the steps iv) and v) are performed taking into account a total percentage calculated over all of the portions 16,22,23 for the points 15 of which the gray level is detected using said video camera 14.

On the basis of the above description, it is clear that the processing unit 18 must be designed in such a way as to be suitable for: comparing the gray level detected by the video camera 14 for each point 15 with the first threshold S1 previously stored in the same processing unit 18 and preferably calculated by the processing unit 18 based upon the reading of the gray levels of the points of the face 4 of the sample metallic element 3b; counting the number of points 15 in each portion or zone 16,22,23 having a gray level that satisfies the predetermined mathematical relationship (1), which is a function of the threshold value as previously indicated; calculating, based upon the total number of points 15 the gray level of which has been detected, the percentage of points that satisfy said predetermined mathematical relationship (1); and comparing the percentage calculated with the second threshold S2 in order to instruct the robot 19 to discard the metallic elements 3 for which the percentage calculated does not correspond to the second threshold value; and to move the metallic elements 3 for which the calculated percentage corresponds to the second threshold value toward the at least a second station 11.

The processing unit 18 must further be designed to set from time to time the first threshold value S1 after that the video camera 14 has detected the gray levels of the points of at least a first zone of a predetermined width of the first face 4 that is free of adhesive of the sample metallic element 3b and/or of a plurality of fixed zones of a predetermined width of the first face 4 of the sample metallic element 3b, one or more being adhesive free and the other zones bearing an insufficient amount of adhesive.

In this way, working on intervals of gray levels for each of the areas framed by the camera 14 and on percentage ranges of points that fall within a range of gray levels and recalculated from time to time by detecting the gray levels of the points of a face of an adhesive-free sample metallic element, it is possible not only to determine whether the adhesive is present or not, but also and above all to determine how much adhesive is present and therefore the thickness of the layer of adhesive 6 deposited in the station 7. This makes it possible to safely discard those metallic elements for which the amount of adhesive 6 would not be enough to ensure there is no danger of detachment in use of the block 5 of friction material, thus obtaining braking elements 2 that are absolutely reliable in use.

The objectives of the disclosure are therefore fully achieved.

The invention claimed is:

1. A method of manufacturing a braking element, the method comprising:
   applying an adhesive to a first face of a metallic element designed in such a way as to constitute a metallic support of the braking element;
   verifying the presence of the adhesive on the first face of the metallic element; and
   applying to the first face of the metallic element a block of friction material;
   wherein verifying the presence of the adhesive comprises:
      detecting, with a video camera, the gray level of a plurality of points arranged in a two-dimensional grid in a first zone of a predetermined width of the first face of the metallic element;
      simultaneously comparing the gray level detected for each point with a predetermined first threshold value and counting the number of the plurality of points that have a gray level that satisfies a relationship which is a function of the predetermined first threshold value, wherein the gray level satisfying the relationship with respect to a particular point of the plurality of points indicates that adhesive is present at the particular point;
      calculating, based upon the total number of points of which the gray level has been detected, a percentage of the plurality of points of the first zone that satisfy said relationship; and
      comparing the percentage calculated with a predetermined second threshold value to determine whether a sufficient amount of adhesive is present in the first zone.

2. The method according to claim 1, wherein, the video camera detects 256 gray levels for each point of the first zone using a digital black and white image, wherein each pixel corresponds to one of the points of the first zone, and wherein each pixel is reproduced according to a range of grays having 256 different tones.

3. The method according to claim 2, wherein the value 0 is attributed to a gray level corresponding to the color black and the value 256 to a gray level corresponding to the color white.

4. The method according to claim 1, wherein the relationship which is the function of the predetermined first threshold value comprises an inequality in which the gray level detected for each point must be less than or equal to a first predetermined range of gray values.

5. The method according to claim 4, wherein the predetermined second threshold value is a second predetermined range of percentage values within which the percentage of points that satisfy said relationship must be comprised.

6. The method according to claim 1, wherein the adhesive comprises an adhesive in a liquid phase, to which a pigment or a dye has been added.

7. The method according to claim 1, wherein verifying the presence of the adhesive on the first face of the metallic element further comprises calibrating a detection threshold of the video camera by setting the predetermined first threshold value, wherein setting the predetermined first threshold value comprises:
    placing, in front of the video camera, a sample metallic element having its first face free of adhesive or bearing an insufficient amount of adhesive, and
    detecting, within at least one predetermined sized portion of the first face of the sample metallic element, the gray level of a plurality of points of said first zone.

8. The method according to claim 1, wherein said detecting, said comparing the gray level detected, and said calculating are performed on a plurality of discreetly positioned predetermined sized portions of the first face of the metallic element.

9. A plant configured to manufacture a braking element, the plant comprising:
    a first station configured to apply an adhesive to a first face of a metallic element of the braking element;
    a second station configured to apply to the first face of the metallic element a block of friction material; and
    a control station configured to verify the presence of the adhesive on the first face of the metallic element after the metallic element has left the first station and before the metallic element reaches the second station, wherein the control station comprises:
        a video camera configured to detect the gray level of a plurality of points arranged in a two-dimensional grid in at least a first predetermined sized portion of the first face of the metallic element;
        a processing unit configured to:
            simultaneously compare the gray level detected for each point with a predetermined first threshold value;
            count the number of the plurality of points having a gray level that satisfies a relationship which is a function of the predetermined first threshold value, wherein the gray level satisfying the relationship with respect to a particular point of the plurality of points indicates that adhesive is present at the particular point;
            calculate, based upon the total number of points of which the gray level has been detected, the percentage of the plurality of points that satisfy said relationship; and
            compare the percentage calculated with a predetermined second threshold value to determine whether a sufficient amount of adhesive is present within the first predetermined sized portion; and
        a robot configured to present the metallic element in front of the video camera and to selectively:
            discard the metallic element if the percentage calculated does not correspond to the predetermined second threshold value; and
            move, toward the second station, the metallic element if the percentage calculated corresponds to the predetermined second threshold value.

10. The plant according to claim 9, wherein the control station further comprises a movable support configured to hold a sample metallic element having a first face that is free of adhesive or bearing an insufficient amount of adhesive.

11. The plant according to claim 10, wherein the movable support is configured to arrange in front of said video camera the sample metallic element while the robot picks up from the first station the metallic element.

12. The plant according to claim 11, wherein the processing unit is configured to set the predetermined first threshold value after the video camera has detected the gray levels of the points of at least a first predetermined sized portion of the first face of the sample metallic element.

13. The plant according to claim 12, wherein the movable support is further configured to subsequently remove from in front of the video camera the sample metallic element, while the robot places the metallic element in front of the video camera.

14. The plant according to claim 10, wherein the sample metallic element is identical to the metallic element except for the first face of the sample metallic element being free of adhesive or bearing an insufficient amount of adhesive.

15. The method according to claim 8, wherein said comparing the percentage calculated is performed while taking into account a total percentage calculated on all of those portions for the points of which the gray level is detected using said video camera.

* * * * *